(12) United States Patent
Erdogan et al.

(10) Patent No.: US 6,711,327 B2
(45) Date of Patent: Mar. 23, 2004

(54) DEVICE AND METHOD FOR COMPENSATING FOR CHROMATIC DISPERSION

(75) Inventors: Turan Erdogan, Spencerport, NY (US); David B. Stegall, Austin, TX (US)

(73) Assignee: University of Rochester, Rochester, NY (US)

(*) Notice: Subject to any disclaimer, the term of this patent is extended or adjusted under 35 U.S.C. 154(b) by 0 days.

(21) Appl. No.: 10/027,183

(22) Filed: Dec. 20, 2001

(65) Prior Publication Data

US 2002/0191909 A1 Dec. 19, 2002

Related U.S. Application Data (60) Provisional application No. 60/258,663, filed on Dec. 30, 2000.

(51) Int. Cl.[7] .......................... G02B 6/34; H04B 10/18
(52) U.S. Cl. ........................ 385/28; 385/37; 398/81; 398/87
(58) Field of Search ............... 385/28, 37; 359/130, 359/566, 569, 573; 398/81, 87

(56) References Cited

U.S. PATENT DOCUMENTS

| | | | |
|---|---|---|---|
| 4,904,040 A | * | 2/1990 | Takesue et al. ............... 385/50 |
| 4,953,939 A | * | 9/1990 | Epworth .................... 385/15 X |
| 5,007,705 A | | 4/1991 | Leonberger et al. |
| 5,912,999 A | | 6/1999 | Brennan, III et al. |
| 6,154,588 A | | 11/2000 | Kai |
| 6,201,914 B1 | * | 3/2001 | Duguay et al. ............... 385/43 |
| 6,289,699 B1 | * | 9/2001 | Kewitsch et al. ......... 385/37 X |
| 6,404,956 B1 | * | 6/2002 | Brennan, III et al. ......... 385/37 |
| 6,408,118 B1 | * | 6/2002 | Ahuja et al. .................. 385/37 |

FOREIGN PATENT DOCUMENTS

| | | |
|---|---|---|
| EP | 0777347 | 6/1997 |
| EP | 1049275 | 11/2000 |
| GB | 2316761 | 3/1998 |

OTHER PUBLICATIONS

Ouellette, Francois; "Dispersion Cancellation Using Linearly Chirped Bragg Grating Filters in Optical Waveguides", Optics Letters vol. 12, No. 10, Oct. 1987.*

"Analysis of Fiber Bragg Gratings for Dispersion Compensation in Reflective and Transmissive Geometries" Litchinister N M et al., Journal of Lightwave Technology, IEEE. New York, US, vol. 15, No. 8.

* cited by examiner

*Primary Examiner*—Gerard R. Strecker
(74) *Attorney, Agent, or Firm*—Nixon Peabody, LLP (57) ABSTRACT

A device and method for compensating for chromatic dispersion in an optical signal. The optical signal is coupled between an optical waveguide of a type having (i) a fundamental-mode waveguide and (ii) a higher-order mode waveguide surrounding the fundamental-mode waveguide, wherein different effective indexes of refraction are associated with the fundamental-mode and higher-order mode waveguides. The device comprises a transmissive, long-period optical grating disposed along a length of the optical waveguide and has a receiving end and a transmitting end. The grating is chirped between the ends along a light conducting axis of the optical waveguide such that different wavelengths of the optical signal are coupled to the fundamental-mode and higher order mode waveguides at different points along the length of the grating so that chromatic dispersion is corrected at the transmitting end.

22 Claims, 5 Drawing Sheets

DEVICE AND METHOD FOR COMPENSATING FOR CHROMATIC DISPERSION

CROSS-REFERENCE TO RELATED APPLICATIONS

This application claims the benefit of priority under 35 U.S.C. § 119(e) of U.S. Provisional Application Ser. No. 60/258,663 filed on Dec. 30, 2000.

FIELD OF THE INVENTION

The present invention relates to a device and method for compensating for chromatic dispersion of an optical signal through a waveguide, such as an optical fiber, that utilizes a transmissive, long-period grating.

BACKGROUND OF THE INVENTION

Chromatic dispersion, or the propagation of different frequency components of an optical signal at different velocities, is an increasingly important problem that must be addressed in high-bit-rate fiber-optic communication systems. Unchecked, dispersion leads to broadening and smearing of the features of rapidly varying optical signals and, as a result, a degradation of the bit-error rate at the receiving end of a link occurs.

There are currently two main approaches used for chromatic dispersion compensation and control in fiber-optic systems, including dispersion compensating fiber (DCF) and chirped fiber Bragg gratings (CFBG). A dispersion compensation module is a simple transmissive device, essentially a spool of fiber, that offers a smooth dispersion spectrum. Unfortunately, DCFs have several shortcomings. A small mode size and a high core-clad index difference are often required. In addition, a large length of such fiber is required. All of these factors result in losses and large nonlinear optical effects over the length of fiber required to provide useful dispersion. It is also difficult to tailor the spectral dependence of the dispersion using DCFs. A second approach for compensating for chromatic dispersion is a chirped fiber Bragg grating (CFBG). It is known that dispersion can be caused and also tailored by reflecting an optical signal off a CFBG. In contrast to DCFs, CFBGs are compact, have very low nonlinear optical effects, and provide a very straightforward means to tailor the dispersion spectrum.

Unfortunately, CFBGs also suffer from several shortcomings. CFBGs are inherently reflective devices and, hence, typically require an optical circulator or lossy coupler. Furthermore, because the differential path lengths giving rise to dispersion occur through reflection over millimeters or centimeters of fiber and because of the inherent difficulty in fabricating fibers with an extremely high degree of uniformity over these length scales, CFBGs tend to suffer from "dispersion ripple," a rapid and large variation of the dispersion over a spectral width as narrow as a typical wavelength division multiplexing (WDM) channel spacing.

Clearly, there is a need for a device and corresponding method for compensating for chromatic dispersion that is compact, that has a tailorable dispersion spectrum, a low nonlinear-optical effect, a low loss, and a low dispersion ripple.

SUMMARY OF THE INVENTION

The present invention provides a device for compensating for chromatic dispersion that eliminates or at least ameliorates the shortcomings of the prior art.

The device compensates for chromatic dispersion in an optical signal conducted through an optical waveguide of a type having (i) a fundamental-mode waveguide and (ii) a higher-order mode waveguide surrounding the fundamental-mode waveguide, wherein different effective indexes of refraction are associated with the fundamental-mode and higher-order mode waveguides. The device comprises a transmissive optical grating disposed along a length of the optical waveguide and has a receiving end and a transmitting end. The grating is chirped between the ends along a light conducting axis of the optical waveguide such that different wavelengths of the optical signal are coupled between the fundamental-mode and higher-order mode waveguides at different points along the length of the grating such that chromatic dispersion is corrected at the transmitting end.

The present invention also provides a device for compensating for chromatic dispersion in an optical signal having a bandwidth $\Delta\lambda$. The device comprises:

an optical waveguide comprising (i) a fundamental-mode waveguide and (ii) a higher-order mode waveguide, wherein each of the fundamental-mode and higher-order mode waveguides has an effective index of refraction, the optical waveguide further including:

a chirped grating having a length $L_G$ that couples light from the fundamental-mode waveguide to the higher-order mode waveguide, wherein the chirp of the grating is calculated by the formula:

$$chirp \cong -\frac{33\Delta n_{\it{eff}}}{DL_F}\left(\frac{nm}{cm}\right)$$

wherein $\Delta n_{\it{eff}}$ is the difference between the effective indexes of refraction of the fundamental-mode and higher-order mode waveguides and $DL_F$ is the dispersion (in ps/nm) to be compensated from a fiber with a dispersion coefficient D and a length $L_F$, and wherein the length of the grating $L_G$ is calculated by the formula:

$$L_G \cong \frac{\Delta\lambda}{chirp}$$

wherein $\Delta\lambda$ is the bandwidth over which compensation is desired

The present invention also provides a method for compensating for chromatic dispersion in an optical signal. The method comprises conducting the optical signal through a device comprising an optical waveguide of a type that has (i) a fundamental-mode waveguide and (ii) a higher-order mode waveguide surrounding the fundamental-mode waveguide, wherein different effective indexes of refraction are associated with the fundamental-mode and higher-order mode waveguides, the device further comprising a transmissive optical grating disposed along a length of the optical waveguide and having a receiving end and a transmitting end, the grating being chirped between the ends along a light conducting axis of the optical waveguide such that different wavelengths of the signal are coupled between the modes of the optical waveguide at different points along the length of the grating such that the dispersion is corrected at the transmitting end.

The invention also provides an apparatus for compensating for chromatic dispersion in an optical signal conducted through an optical waveguide of a type having (i) a fundamental-mode waveguide and (ii) a higher-order mode waveguide surrounding the fundamental-mode waveguide, wherein different effective indexes of refraction are associated with the fundamental-mode and higher-order mode waveguides, the chromatic dispersion having a first-order dispersion and higher-order dispersion. The apparatus comprises a device that compensates the first order dispersion and a device that compensates the higher-order dispersion. The device that compensates the higher-order dispersion comprises a transmissive optical grating disposed along a length of the optical waveguide and having a receiving end and a transmitting end, the grating being chirped between the ends along a light conducting axis of the optical waveguide such that different wavelengths of the optical signal are coupled to the fundamental-mode and higher-order mode waveguides at different points along the length of the grating such that chromatic dispersion is corrected at the transmitting end. The invention also provides a method for compensating for chromatic dispersion using this apparatus.

BRIEF DESCRIPTION OF THE DRAWINGS

The invention is best understood when read in connection with the accompanying drawings. It is emphasized that, according to common practice, the various features of the drawings are not to scale. On the contrary, the dimensions of the various features are arbitrarily expanded or reduced for clarity.

Included in the drawings are the following figures.

DETAILED DESCRIPTION OF THE PREFERRED EMBODIMENTS

Figure 1:
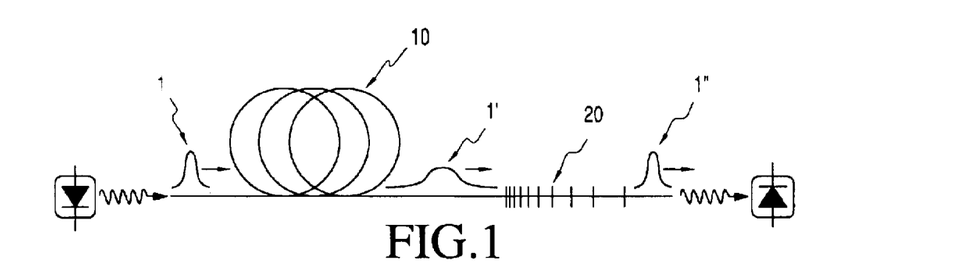
FIG. 1 illustrates compensation of a chromatically dispersed optical signal by transmission through a chirped transmissive optical grating.

The present invention provides a device and method for compensating for chromatic dispersion in an optical waveguide. A schematic illustration of the compensation of a chromatically dispersed optical signal through a chirped transmissive optical grating is shown in FIG. 1. Here, an optical signal 1 traveling through optical waveguide 10 becomes chromatically dispersed (shown as chromatically dispersed optical signal 1'). The chromatically dispersed optical signal 1' then conducts through a transmissive optical waveguide 20 which compensates for chromatic dispersion and produces a compensated optical signal 1".

Figure 2:
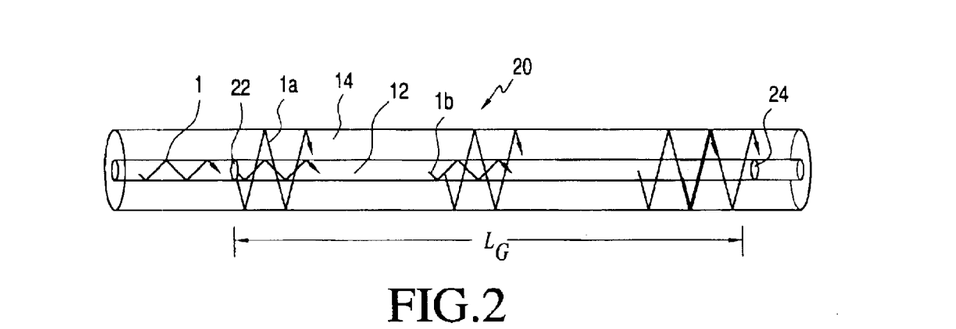
FIG. 2 illustrates a device having a chirped transmissive optical grating disposed along a length of an optical waveguide, the grating having a receiving end and a transmitting end, wherein different wavelengths of an optical signal are coupled to the fundamental-mode waveguide and higher-order mode waveguide of the optical waveguide at different points along the length of the grating.

An embodiment of the device of the invention is illustrated in FIG. 2. The device includes a chirped transmissive optical grating 20 disposed along a length of an optical waveguide that has a fundamental-mode waveguide 12 and a higher order mode waveguide 14 that surrounds the fundamental-mode waveguide. As shown in FIG. 2, fundamental-mode waveguide 12 is a single-mode fiber core and higher-order mode waveguide 14 is a multi-mode waveguide that surrounds the core. Grating 20 has a receiving end 22 and a transmitting end 24, wherein different wavelengths 1b of optical signal 1 are coupled to fundamental-mode waveguide 12 and higher-order mode waveguide 14 at different points along the length of grating 20 such that chromatic dispersion is corrected at the transmitting end.

The higher-order mode waveguide has an effective index of refraction that is less than the effective index of refraction of the fundamental-mode waveguide. As a result, the fundamental mode and the higher-order mode travel at different (group) velocities and the different frequency components of the optical signal experience different delay times in traversing the optical waveguide. By controlling the amplitude and chirp functions of grating 20, a prescribed dispersion as a function of wavelength can be imparted on an optical signal traveling through the device.

As shown in FIG. 2, shorter wavelength optical signal 1a couples from fundamental-mode waveguide 12 to higher-order waveguide 14 closer to receiving end 22, while longer wavelength optical signal 1b couples to higher-order waveguide 14 closer to transmitting end 24. The shorter wavelength optical signal 1a travels a longer distance in the higher-order mode and, thus, experiences a shorter delay time in traversing optical grating 20.

The dispersion achieved by optical grating 20 can be approximated by the formula:

$$d_{grating} \cong \frac{33\Delta n_{eff}}{Chirp}\left(\frac{ps}{nm}\right) \quad (1)$$

where $\Delta n_{eff}$ is the difference between the effective indexes of refraction of the fundamental-mode waveguide and higher-order mode waveguide and Chirp is the rate of change of the most resonant wavelength for coupling with position in the grating, or:

$$Chirp \cong \frac{\Delta\lambda}{L_G}\left(\frac{nm}{cm}\right) \quad (2)$$

for a grating of length $L_G$ with a net change in resonant wavelength of $\Delta\lambda$. Since light traveling through a length of optical waveguide/fiber $L_F$ with a dispersion coefficient of D obtains a dispersion of $DL_F$, the chirp of the grating required to compensate this dispersion according to Eq. (1) is:

$$Chirp \cong -\frac{33\Delta n_{eff}}{DL_F}\left(\frac{nm}{cm}\right). \quad (3)$$

The grating length that is required is determined by the bandwidth $\Delta\lambda$ over which compensation is desired. From Eq. (2), the approximate grating length can be calculated using the formula:

$$L_G \cong \frac{\Delta\lambda}{Chirp} \quad (4)$$

Thus, the chirp and length ($L_G$) of the grating can be selected to provide the desired chromatic dispersion compensation.

Figure 3:
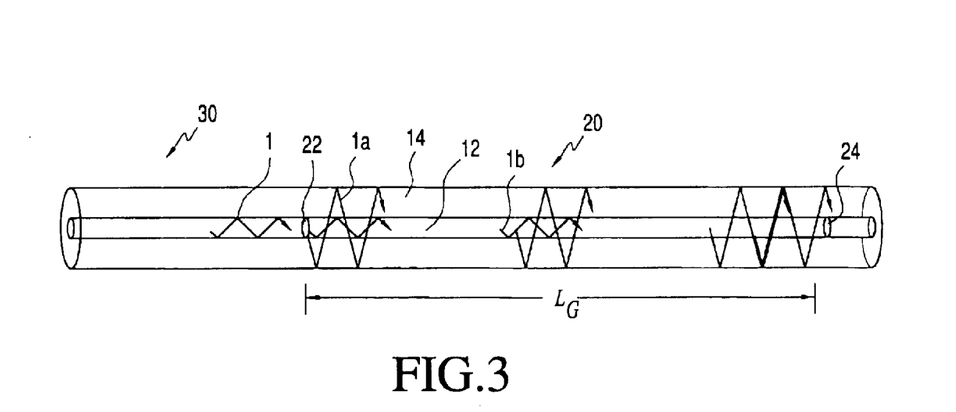
FIG. 3 illustrates the device of FIG. 2 further having a device that compensates first-order dispersion prior to transmission of the optical signal into the chirped transmissive optical grating.

The device illustrated in FIG. 2 can be combined with a device that compensates first-order dispersion prior to transmission of the optical signal through the optical grating of the device of the present invention. FIG. 3 illustrates a device 30 that compensates first order dispersion positioned adjacent the receiving end 22 of optical grating 20. Device 30 compensates first-order chromatic dispersion, but does not achieve the correct dispersion compensation at all wavelengths. Optical grating 20 then compensates the small, but wavelength dependent, portion of the dispersion that is not compensated by device 30. This wavelength dependence of the dispersion is the second and higher-order chromatic dispersion. Device 30 can be, for example, a DCF or CFBG.

Figure 4:
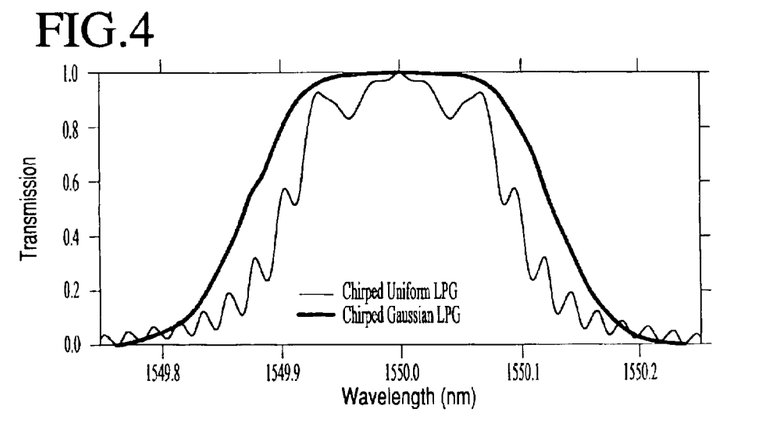
FIG. 4 illustrates the transmission achieved as a function of optical signal wavelength by transmission of an optical signal through chirped uniform and Gaussian transmissive optical gratings.
Figure 5:
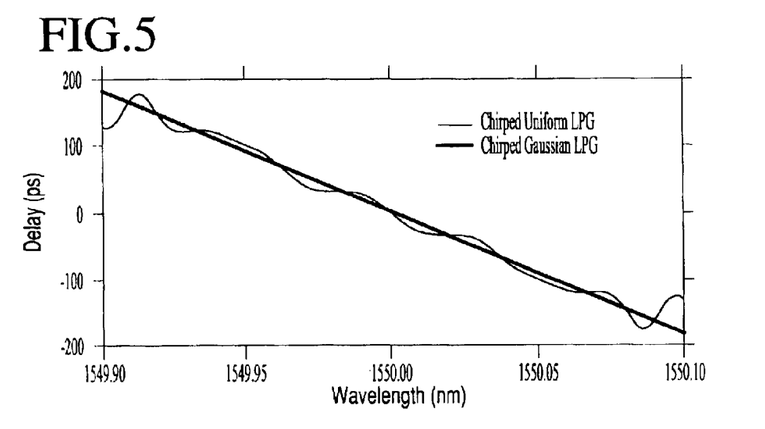
FIG. 5 illustrates the delay achieved as a function of optical signal wavelength by transmission of an optical signal through chirped uniform and Gaussian transmissive optical gratings.
Figure 6:
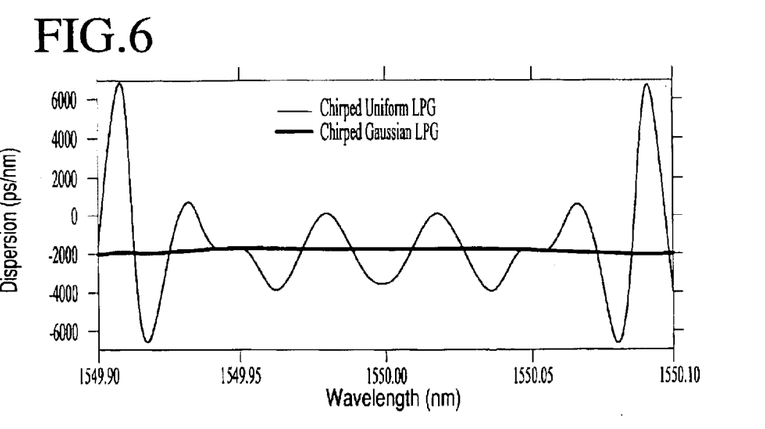
FIG. 6 illustrates the dispersion achieved as a function of optical signal wavelength by transmission of an optical signal through chirped uniform and Gaussian transmissive optical gratings.

FIGS. 4–6 illustrate the transmission, delay, and dispersion, respectively, as functions of wavelength achieved by transmission of an optical signal through both uniform and Gaussian-apodized chirped gratings having lengths of 80 cm (measured as the full-width-at-half-maximum for the Gaussian-apodized grating).

Each grating has a peak coupling coefficient 3.61×π (units of 1/m) and a linear chirp of the resonant wavelength of $-2.5\times10^{-3}$ nm/cm, and the effective indexes of the two modes involved differ by $\Delta n_{eff}=0.15$. As shown in FIG. 4, transmission is smoother using a Gaussian long-period grating (LPG) then using a uniform LPG. FIG. 5 shows that delay as a function of wavelength is substantially smoother using the Gaussian grating, and FIG. 6 shows that the dispersion is almost constant for this case (note that first-order dispersion compensation requires a constant dispersion).

In a preferred embodiment, the higher-order mode waveguide is environmentally isolated so that bends and contact incurred during or after packaging do not translate into variation in the optical properties of the device. Since the expected device lengths are several meters, practical devices will likely need to be packaged by winding the fiber and, thus, will be susceptible to bend or contact induced perturbations. It is preferable that at least a portion of the higher order mode waveguide propagates in a material that has an effective index of refraction that is substantially lower than the effective index of refraction of the higher-order mode waveguide.

Figure 7:
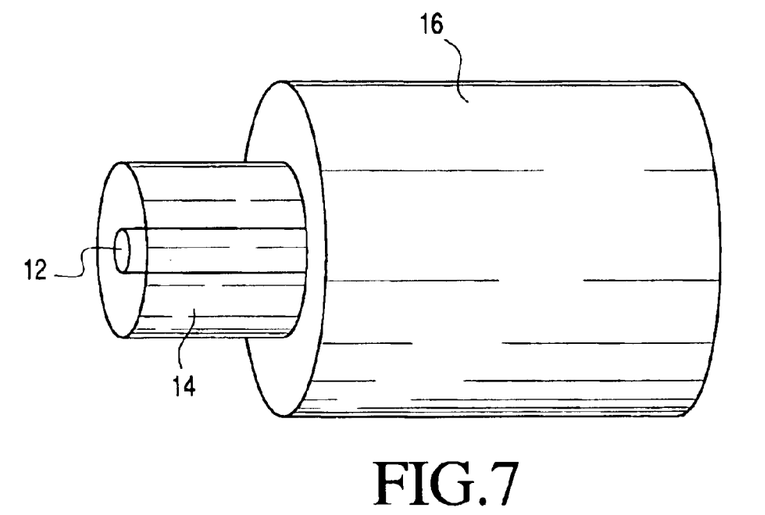
FIG. 7 illustrates a device having a fundamental-mode waveguide surrounded by a higher-order mode waveguide and a coating.
Figure 8:
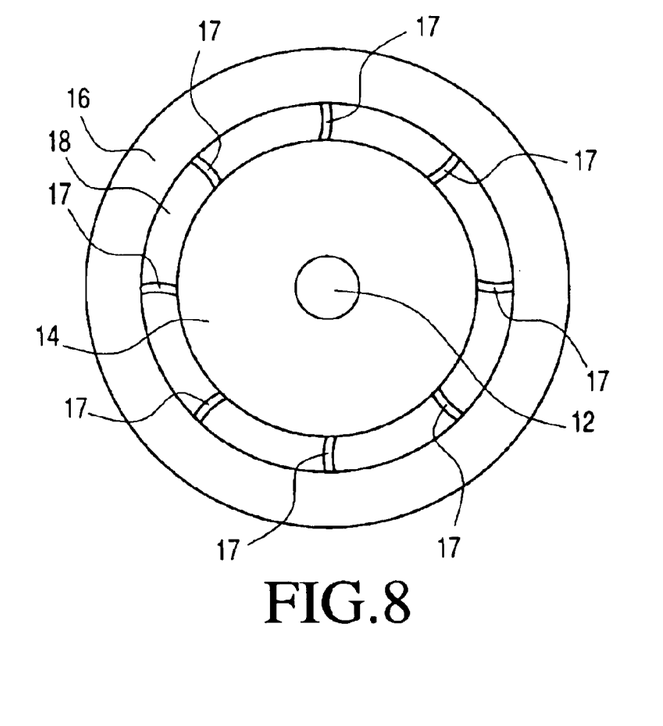
FIG. 8 illustrates a device having a fundamental-mode waveguide surrounded by a higher-order mode waveguide, an air cladding, and a coating.

FIGS. 7 and 8 illustrate embodiments of the invention wherein the higher order mode waveguide is environmentally isolated. FIG. 7 shows a coating 16 that surrounds higher-order mode waveguide 14. Coating 16 is composed of a material that has an effective index of refraction that is substantially lower than the effective index of refraction of the higher-order mode waveguide. The coating can be composed of, for example, air, plastic, or a low effective index of refraction glass. As an example, if the effective index of refraction of the higher-order mode waveguide is 1.45, the coating should have an effective index of refraction of less than about 1.4. Coating 16 is preferably composed of TEFLON, which has an effective index of refraction of about 1.33.

FIG. 8 illustrates an embodiment of the invention where higher-order mode waveguide 14 is surrounded by an air cladding 18 and coating 16. Supports 17 are positioned between air cladding 18 and coating 16. The supports are almost invisible to light and support coating 16 adjacent air cladding 18 and higher-order mode waveguide 14. In this embodiment, coating 16 is preferably composed of glass.

Figure 9:
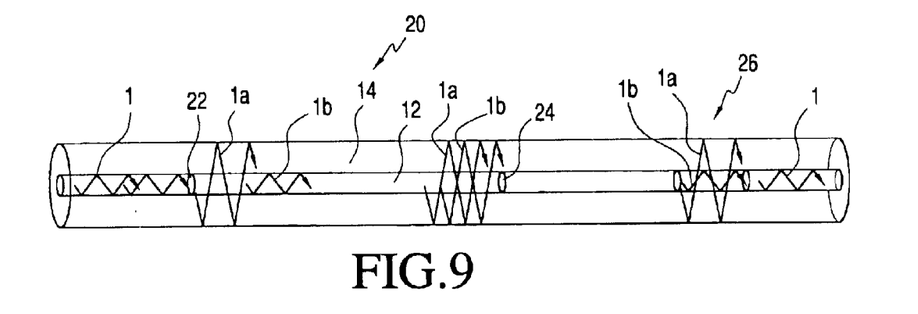
FIG. 9 illustrates the device of FIG. 2 further having a second chirped transmissive optical grating of equal and opposite chirp.

It may be desirable to return the optical signal transmitting in the higher order mode waveguide to the fundamental-mode waveguide 12 for further propagation of the optical signal. The invention also provides a bi-grating structure which includes a second chirped transmissive optical grating. FIG. 9 illustrates an embodiment of the bi-grating structure of the invention. Here, the device illustrated in FIG. 2 further includes a second chirped transmissive optical grating 26 adjacent the transmitting end 24 of grating 20. Grating 26 has an equal and opposite chirp as a function of position in the grating with respect to grating 20 and, as a result, returns optical signals 1a and 1b to the fundamental-mode waveguide 12 for further propagation.

Figure 10:
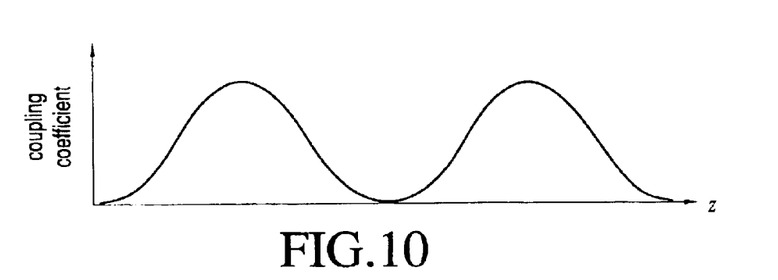
FIG. 10 illustrates the degree of coupling as a function of length along gratings such as those illustrated in FIG. 9 for the case of two Gaussian-apodized gratings (the degree of coupling is proportional to a quantity called the coupling coefficient).

FIG. 10 illustrates the degree of coupling as a function of length along gratings such as those illustrated in FIG. 9 for the case of two Gaussian-apodized gratings (the degree of coupling is proportional to a quantity called the coupling coefficient). The two gratings have equal magnitude but opposite-sign chirp, and are each apodized in order to obtain a smooth transmission spectrum.

Figure 11:
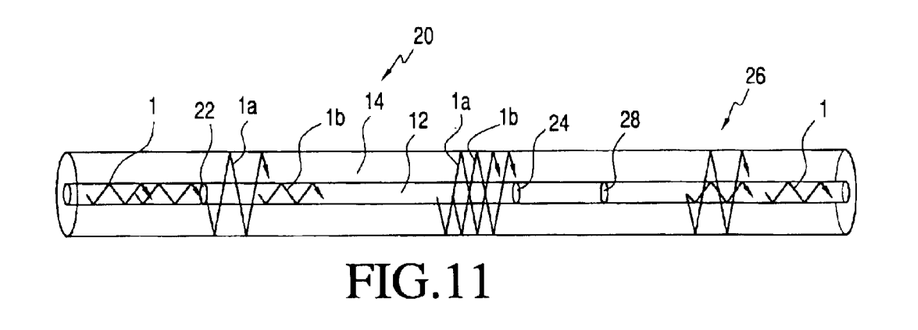
FIG. 11 illustrates the device of FIG. 9 further having a fundamental-mode waveguide block between the chirped transmissive optical gratings.

Unfortunately, in the bi-grating structure there are instances where some wavelengths traveling through grating 20 are not completely coupled to higher order mode waveguide 14. For example, wavelengths at the edges of the transmission band are only partially coupled. As a result, high-frequency interference fringes will result in the transmission spectrum near these wavelengths. These interference fringes can be removed by blocking the fundamental-mode waveguide transmission between gratings 20 and 26. FIG. 11 illustrates the device of FIG. 9 further having a fundamental-mode waveguide block 28 between grating 20 and grating 26. Block 28 can be, for example, an absorptive block or a fiber Bragg grating. Preferably, block 28 is a fiber Bragg grating that blocks only the wavelengths transmitted and does not block the wavelengths that are not being compensated.

Figure 12:
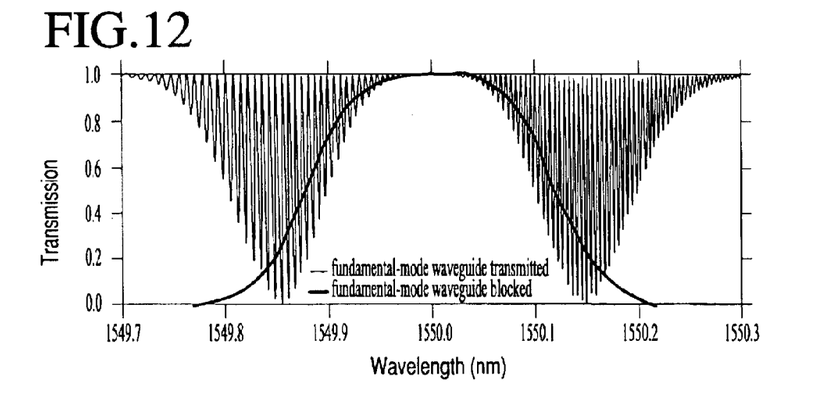
FIG. 12 illustrates the transmission achieved as a function of optical signal wavelength by transmission of an optical signal through the devices of FIG. 9 (fundamental-mode waveguide transmitted) and FIG. 11 (fundamental-mode waveguide blocked).
Figure 13:
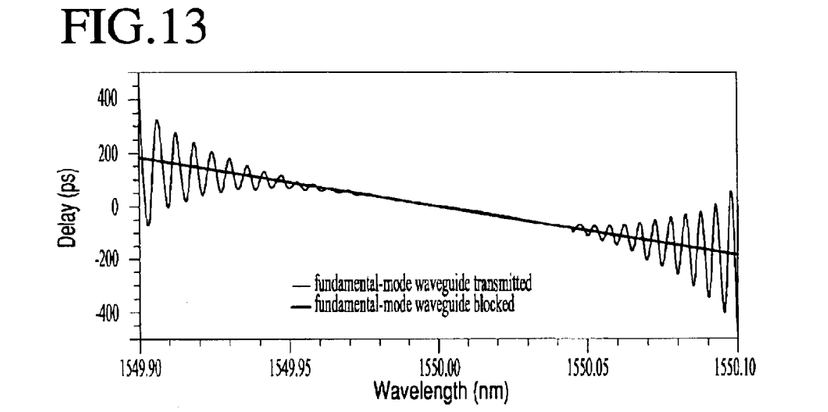
FIG. 13 illustrates the delay achieved as a function of optical signal wavelength by transmission of an optical signal through the devices of FIG. 9 (fundamental-mode waveguide transmitted) and FIG. 11 (fundamental-mode waveguide blocked).
Figure 14:
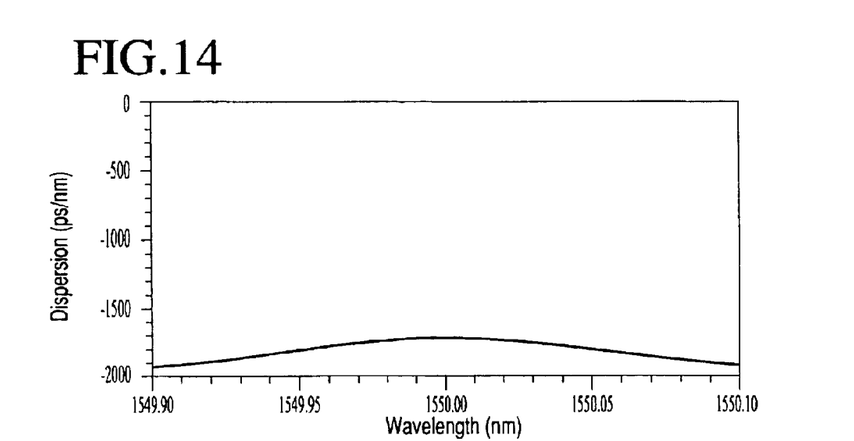
FIG. 14 illustrates the dispersion achieved as a function of optical signal wavelength by transmission of an optical signal through the device of FIG. 11 (fundamental-mode waveguide blocked).

FIGS. 12–14 illustrate the transmission, delay, and dispersion, respectively, as functions of wavelength achieved by transmission of an optical signal through bi-grating structures both with and without a fundamental-mode-waveguide block. Each Gaussian-apodized chirped grating has a length of 50 cm (measured as the full-width-at-half-maximum) and the total device length (past which the Gaussian gratings are truncated) is 3 meters. Each grating has a linear chirp of the resonant wavelength of −5×10−3 run/cm, and the effective indexes of the two modes involved differ by Aneff=0.15. As shown in FIGS. 12 and 13, both the transmission and the delay, respectively, are much smoother with the use of a block than without. FIG. 14 demonstrates that the dispersion can be quite smooth and almost constant when a block is used.

The invention provides a transmissive device that is more compact than dispersion compensation modules using DCFs. In addition, the invention allows tailoring of the compensation spectrum. Furthermore, loss and nonlinear effects are minimized because the lengths of the waveguide is less than the length required for DCFs. In addition, the short-scale fiber non-uniformity minimizes problems associated with dispersion ripple because the differential path lengths giving rise to dispersion for frequency bandwidths comparable to a WDM channel spacing correspond to physical distances on the scale of tens of centimeters to meters, rather than millimeters to centimeters for CFBGs. Fiber properties like the effective index of refraction can be made very uniform when averaged over these longer lengths of greater than 10's of cm.

EXAMPLE

To compensate for 2000 ps/nm of dispersion over a 1 nm bandwidth (obtained, for example, by propagation through 100 km of fiber with a dispersion coefficient of 20 ps/nm·km), a higher-order mode waveguide having an effective index of refraction difference $\Delta n_{eff}$ of 0.15 from that of the fundamental-mode waveguide can be used. The grating is designed having a chirp of −0.0025 nm/cm and a length of 4 meters.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A device for compensating for chromatic dispersion in an optical signal conducted through an optical waveguide of a type having (i) a fundamental-mode waveguide and (ii) a higher-order mode waveguide surrounding said fundamental-mode waveguide, wherein different effective indexes of refraction are associated with said fundamental-mode and higher-order mode waveguides, said device comprising a transmissive optical grating integrated along a length of said optical waveguide and having a receiving end and a transmitting end, said grating being chirped between said ends along a light conducting axis of said optical waveguide such that different wavelengths of said optical signal are coupled between said fundamental-mode and higher-order mode waveguides at different points along the length of the grating such that chromatic dispersion is corrected at said transmitting end.

2. The device according to claim 1 wherein the effective index of refraction of said higher-order mode waveguide is less than the effective index of refraction of said fundamental-mode waveguide, and wherein said grating is chirped such that shorter wavelengths of said optical signal are coupled to said higher-order mode waveguide at a point closer to said receiving end than longer wavelengths of said signal such that said shorter and longer wavelengths of light experience different delay times through said grating.

3. The device according to claim 1 wherein said grating is chirped such that longer wavelengths of said optical signal are coupled to said higher-order mode waveguide at a point closer to said receiving end than shorter wavelengths of said signal such that said longer and shorter wavelengths of light experience different delay times through said grating.

4. The device according to claim 1 wherein said fundamental-mode waveguide is a single-mode waveguide and said higher-order mode waveguide is a multi-mode waveguide.

5. The device according to claim 1 wherein said fundamental-mode waveguide is a single-mode fiber core and said higher-order mode waveguide surrounds said single-mode fiber core.

6. The device according to claim 1 wherein at least a portion of the optical signal confined by said higher-order mode waveguide propagates in a material that has an index of refraction that is substantially lower than the index of refraction of said higher-order mode waveguide.

7. The device according to claim 6 wherein said material is air or plastic.

8. The device according to claim 1 wherein said grating is a long-period grating.

9. A device for compensating for chromatic dispersion in an optical signal having a bandwidth $\Delta\lambda$, said device comprising:

an optical waveguide comprising (i) a fundamental-mode waveguide and (ii) a higher-order mode waveguide, wherein each of said fundamental-mode and higher-order mode waveguides has an effective index of refraction, said optical waveguide further including:

a chirped grating having a length $L_G$ that couples light from said fundamental-mode waveguide to said higher-order mode waveguide, wherein the chirp of said grating is calculated by the formula:

$$chirp \cong -\frac{33\Delta n_{eff}}{DL_F}\left(\frac{nm}{cm}\right)$$

wherein $\Delta n_{eff}$ is the difference between the effective indexes of refraction of said fundamental-mode and higher-order mode waveguides and $DL_F$ is the dispersion (in ps/nm) to be compensated from a fiber with a dispersion coefficient D and a length $L_F$, wherein the length of said grating $L_G$ is calculated by the formula:

$$L_G \cong \frac{\Delta\lambda}{chirp}$$

wherein $\Delta\lambda$ is the bandwidth over which compensation is desired.

10. The device according to claim 9 wherein said fundamental-mode waveguide is a single-mode waveguide and said higher-order mode waveguide is a multi-mode waveguide.

11. The device according to claim 9 wherein said fundamental-mode waveguide is a single-mode fiber core and wherein said high-order mode waveguide surrounds said single-mode fiber core.

12. The device according to claim 9 wherein at least a portion of said higher-order mode waveguide propagates in a material that has an index of refraction that is substantially lower than the index of refraction of said higher order mode waveguide.

13. The device according to claim 9 wherein said material is air or plastic.

14. The device according to claim 9 wherein said optical waveguide further comprises a second transmissive optical grating that couples light from said higher-order mode waveguide to said fundamental-mode waveguide.

15. A method for compensating for chromatic dispersion in an optical signal comprising:

conducting said optical signal through a device comprising an optical waveguide of a type that has (i) a fundamental-mode waveguide and (ii) a higher order mode waveguide surrounding said fundamental-mode waveguide, wherein different effective indexes of refraction are associated with said fundamental-mode and higher-order mode waveguides, said device further comprising a transmissive optical grating integrated along a length of said optical waveguide and having a receiving end and a transmitting end, said grating being chirped between said ends along a light conducting axis of said optical waveguide such that different wavelengths of said signal are coupled to said modes of said optical waveguide at different points along the length of the grating such that said dispersion is corrected at said transmitting end.

16. The method according to claim 15 wherein the effective index of refraction of said higher-order mode waveguide is less than the effective index of refraction of said fundamental-mode waveguide, and wherein said grating is chirped such that shorter wavelengths of said optical signal are coupled to said higher-order mode waveguide at a point closer to said receiving end than longer wavelengths of said signal such that said shorter and longer wavelengths of light experience different delay times through said grating.

17. The method according to claim 15 wherein said grating is chirped such that longer wavelengths of said optical signal are coupled to said higher order mode waveguide at a point closer to said receiving end than shorter wavelengths of said signal such that said longer and shorter wavelengths of light experience different delay times through said grating.

18. The method according to claim 15 wherein said optical signal has a bandwidth $\Delta\lambda$ and wherein the chirp of said grating is calculated by the formula:

$$chirp \cong -\frac{33\Delta n_{\mathit{eff}}}{DL_F}\left(\frac{nm}{cm}\right)$$

wherein $\Delta n_{\mathit{eff}}$ is the difference between the effective indexes of refraction of said fundamental-mode and higher-order mode waveguides and $DL_F$ is the dispersion (in ps/nm) to be compensated from a fiber with a dispersion coefficient D and a length $L_F$, and wherein said grating has a length $L_G$ calculated by the formula:

$$L_G \cong \frac{\Delta\lambda}{chirp}$$

wherein $\Delta\lambda$ is the bandwidth over which compensation is desired.

19. The method according to claim 15 wherein said optical waveguide further comprises a second transmissive optical grating that couples light from said higher-order mode waveguide to said fundamental-mode waveguide.

20. An apparatus for compensating for chromatic dispersion in an optical signal conducted through an optical waveguide of a type having (i) a fundamental-mode waveguide and (ii) a higher order mode waveguide surrounding said fundamental mode waveguide, wherein different effective indexes of refraction are associated with said fundamental mode and higher order mode waveguides, said chromatic dispersion having a first order dispersion and higher order dispersion, said apparatus comprising:

a device that compensates said first order dispersion; and a device that compensates said higher-order dispersion comprising: a transmissive optical grating integrated along a length of said optical waveguide and having a receiving end and a transmitting end, said grating being chirped between said ends along a light conducting axis of said optical waveguide such that different wavelengths of said optical signal are coupled to said fundamental-mode and higher-order mode waveguides at different points along the length of the grating such that chromatic dispersion is corrected at said transmitting end.

21. The apparatus according to claim 20 wherein the device that compensates said first order dispersion is selected from the group consisting of a dispersion compensating fiber (DCF) and a chirped fiber Bragg grating (CFBG).

22. A method for compensating for chromatic dispersion having a first-order dispersion and higher-order dispersion in an optical signal, said method comprising conducting said optical signal through:

a device that compensates said first order dispersion; and a device that compensates said higher-order dispersion comprising an optical waveguide of a type that has (i) a fundamental-mode waveguide and (ii) a higher-order mode waveguide surrounding said fundamental-mode waveguide, wherein different effective indexes of refraction are associated with said fundamental-mode and higher-order mode waveguides, said device further comprising a transmissive optical grating integrated along a length of said optical waveguide and having a receiving end and a transmitting end, said grating being chirped between said ends along a light conducting axis of said optical waveguide such that different wavelengths of said signal are coupled to said fundamental-mode and higher-order mode waveguides at different points along the length of the grating such that said dispersion is corrected at said transmitting end.

* * * * *